United States Patent [19]
Seaton

[11] 3,715,533
[45] Feb. 6, 1973

[54] VEHICLE PENDULUM ALARM SWITCH
[75] Inventor: William Joe Seaton, Kearns, Utah
[73] Assignee: Emdeko International, Inc., Salt Lake City, Utah
[22] Filed: April 2, 1971
[21] Appl. No.: 130,754

[52] U.S. Cl. .................................. 200/61.52, 340/65
[51] Int. Cl. .............................................. B60r 25/10
[58] Field of Search .......... 340/52 H, 63, 64, 65, 276; 200/42, 61.45, 61.52

[56] References Cited
UNITED STATES PATENTS

| 2,947,830 | 8/1960 | Goss | 340/65 X |
| 3,562,706 | 2/1971 | Mason | 340/65 |
| 3,531,793 | 9/1970 | Shottenfeld | 340/276 |

*Primary Examiner*—Alvin H. Waring
*Attorney*—Miketta, Glenney, Poms & Smith

[57] ABSTRACT

An alarm system for automobiles and other vehicles is disclosed in which pendulum switches are provided, including one wherein the sensitivity can be readily adjusted.

2 Claims, 5 Drawing Figures

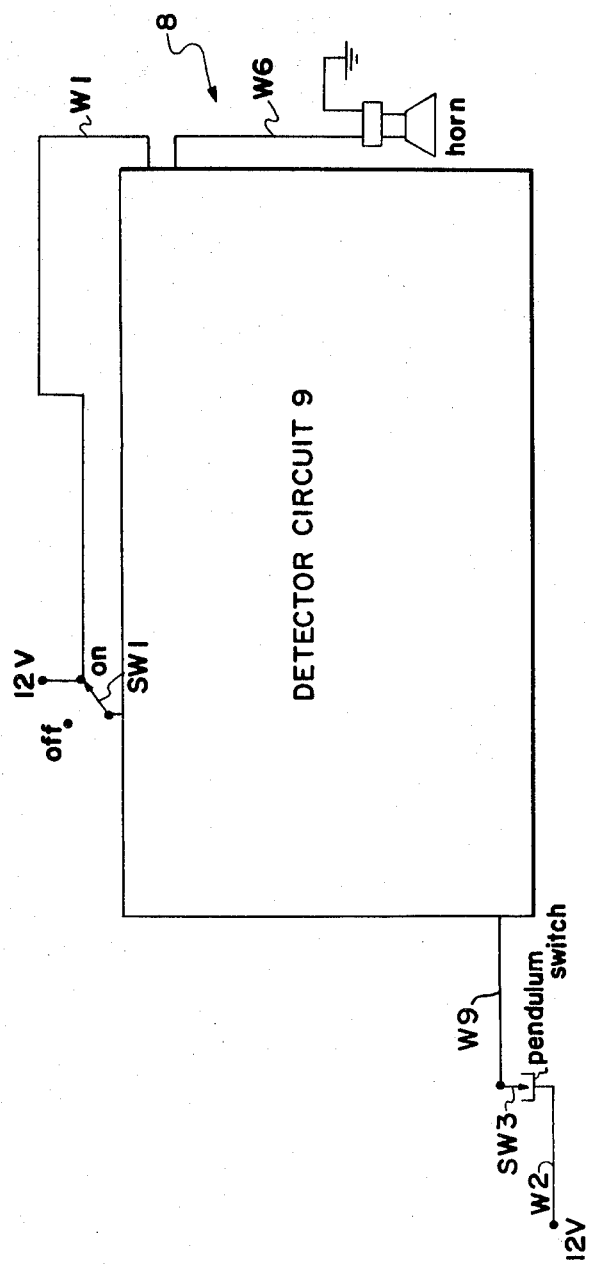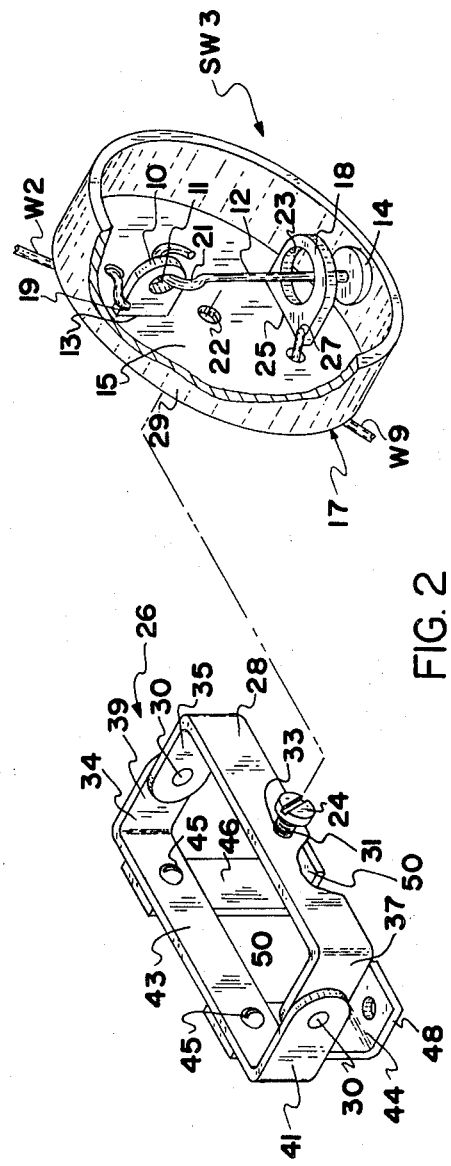

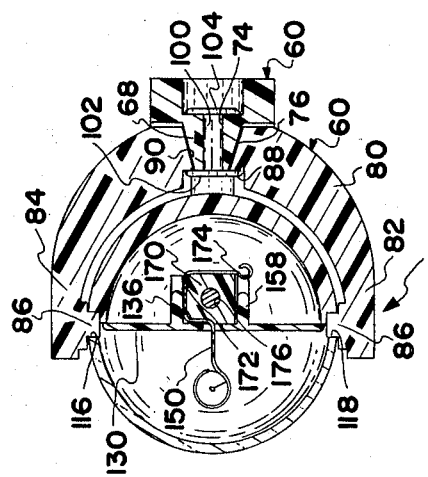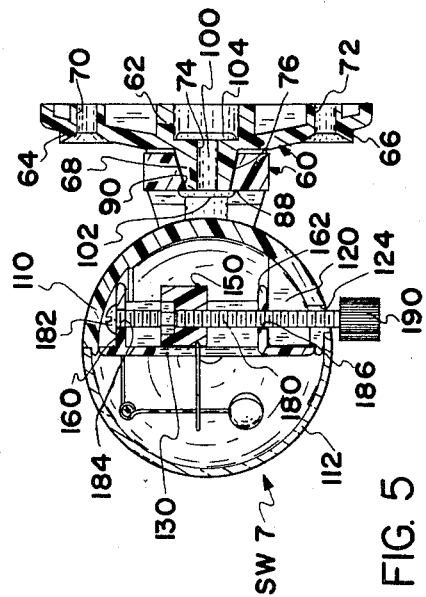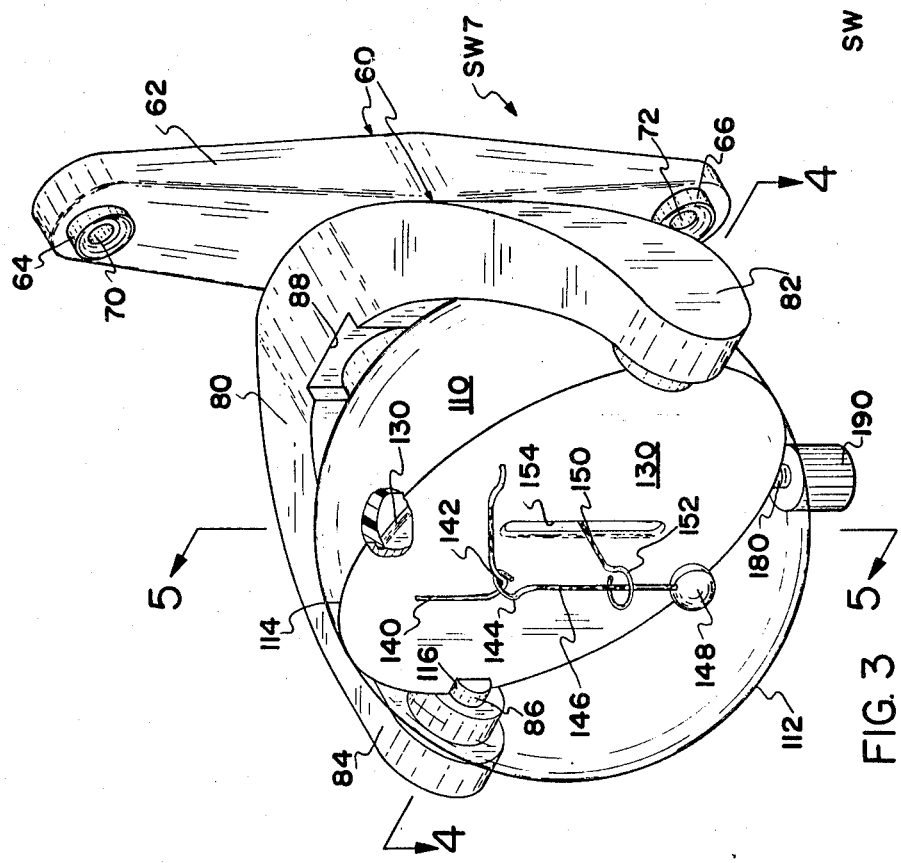

VEHICLE PENDULUM ALARM SWITCH

BACKGROUND

1. Field of Invention

The present invention relates generally to alarm systems and more particularly to alarm systems for automobiles and similar vehicles.

2. Prior Art

While numerous alarm systems of diverse types for protecting automobiles and the like have been proposed, nearly all have suffered one or more serious drawbacks. Among such disadvantages are impractical concepts, expensive mechanisms and/or unreliable systems. Many prior art systems of the type in question do not accommodate all possible orientations of the automobile with which they are associated and most, when actuated, provide an undue drain on the battery, leaving the automobile essentially disabled if the owner does not detect the alarm promptly following actuation. Systems of the type under consideration which provide their own electrical source of power have not proved to be acceptable. Automobile alarm systems of the past have, more often than not, been difficult to install. When pendulum switches have been included, the current flow across such systems has been of such magnitude that welding of the pendulum to its adjacent contact results, which not only discharges the battery but disables the alarm system.

I am aware of prior art U.S. Pat. Nos. 1,230,787; 1,528,423; 2,122,921; 2,207,406; 2,344,014; 3,074,049; 3,197,734; 3,296,591; 3,422,398; 3,531,793 and 3,534,350.

SUMMARY AND OBJECTS OF THE PRESENT INVENTION

Alarm systems according to the present invention comprise circuitry including a pendulum switch which operates from a battery carried by the automobile or like vehicle and detects intrusion of an unauthorized person into the interior of the automobile.

A pendulum switch at the dashboard can be adjusted or set manually in an off condition depending on the orientation of the vehicle. The preferred pendulum switch has an adjustment which controls the sensitivity of the switch by changing the effective length of the pendulum in respect to the adjacent contact.

Accordingly, it is a primary object of the present invention to provide a novel alarm system for automobiles which operates from a battery carried by an automobile or other vehicle.

It is another principal object of the present invention to provide an improved automobile or vehicle alarm system which operates from a battery carried by the automobile and includes a pendulum switch.

It is another important object to provide a novel alarm pendulum switch.

These and other objects and features of the present invention will become more fully apparent from the following description and appended claims taken in conjunction with the accompanying drawings.

BRIEF DESCRIPTION OF THE DRAWINGS

FIG. 1 is a generalized circuit diagram comprising an alarm system according to the present invention;

FIG. 2 is a partially exploded perspective illustrating a presently preferred pendulum switch used as a part of systems according to the present invention;

FIG. 3 is a perspective representation of another presently preferred pendulum switch of the present invention;

FIG. 4 is a cross section taken along line 4—4 of FIG. 3; and

FIG. 5 is a cross section taken along line 5—5 of FIG. 3.

DETAILED DESCRIPTION OF THE ILLUSTRATED EMBODIMENTS

Reference is now made to the drawings and particularly to FIG. 1, which illustrates a currently preferred circuit according to the present invention. The circuit 8 is connected to a 12 volt battery, carried by the automobile or other vehicle, at wires W1 and W2 and to the illustrated horn at wire W6 when wire W1 connects thereto by suitable means (not shown) in detector circuit 9. The voltage of the battery is selectively communicated across switch SW1 to detector circuit 9. The horn and the battery may comprise part of the essential equipment of the automobile or other vehicle. Alternatively, a separate battery and/or a separate horn, not part of the basic equipment of the automobile or vehicle, may be used. In such a case, the separate battery and/or the separate horn will be carried upon or by the vehicle.

Wire W2 connects to one terminal or contact of a pendulum switch SW3, the other terminal or contact of which connects to detector circuit 9.

When switch SW3 is closed by an intruder, detector circuit 9 detects a small current flow at wire W9 and functions to connect wire W6 to wire W1 enabling electrical energy to reach the horn via wire W6 causing it to sound. Detector circuit 9 may be provided by conventional circuitry well known to those skilled in the art and for this reason is not illustrated in detail.

Specific reference is now made to FIG. 2, which illustrates one presently preferred pendulum switch SW3 together with mounting structure for the switch, all shown in partially exploded perspective. Specifically, a vertically oriented conductive ear 10 having an aperture 11 is mounted in electrically insulated relation at 13 to the back plate 15 of a housing 17. Electrical energy from a battery is delivered to the pendulum switch SW3 along wire W2, which is connected at 19 to the ear 10. A conductive pendulum rod 12 is suspended from the ear 10 by placing the eyelet 21 of the pendulum rod through the eye 11 of the ear 10. The pendulum rod 12 is adapted to hang by force of gravity centrally through an eyelet 23 in a second, but horizontally oriented conductive ear 18, the pendulum terminating at its lower end in a weight 14. The ear 18 is likewise mounted at 25 in electrically insulated relation to the back plate 15 of the switch housing 17 and is electrically connected to wire W9 at location 27. The switch housing 17 is illustrated as having a circumferential flange 29, which is integral with the back 15. The back 15 includes an aperture 22 through which a screw 24 is placed and secured to a support in such a manner as to accommodate rotation of the switch housing 17 in respect to the threaded shaft 31 of the screw 24. Consequently, the housing 17 may be rotated upon the screw 24 to obtain proper orientation of the pendulum through the eyelet 23 in space relation to the ear 18 no matter what ground or other orientation of the vehicle exists in which the switch is mounted. The screw 24 is illustrated as being threadedly secured in an aperture 33 of a bracket arm 28. The bracket arm 28 comprises part of an overall bracket 26 used to support the switch SW3, for example, upon the dashboard of an automobile or the like. The bracket arm 28 is U-shaped, the legs 35 and 37 thereof being rotatably secured to legs 39 and 41, respectively, of a bracket member 34 by pivot pins 30. In this way, arm 28 may be rotated about an axis comprising the axes of the two pins 30. The central portion of the bracket member 34 is secured by screws 45 to upstanding leg members 44 and 46, the ends 48 and 50 thereof being adapted to receive screws of the like whereby the bracket 26 is secured to the dash of an automobile, or the like. By proper rotation of the arm 28 about pins 30 and of housing 17 about screw 24, the pendulum switch SW3 may be set in open condition independent of the orientation of the car, namely whether the car is located on an incline, at level area or the like.

Particular reference is now made to FIGS. 3 through 5, which illustrate a second presently preferred pendulum switch according to the present invention, generally designated SW7. Switch SW7 may be used in lieu of switch SW3 of FIG. 2. Switch SW7 comprises support structure, generally designated 60, and formed of injection-molded plastic. The plastic frame which the mounting structure 60 is formed may be CYCOLAC ABS, manufactured by Marbon Chemical Co. The support structure 60 comprises a mounting bar 62 with hollow portions at the back thereof and three bosses 64, 66 and 68 each having a central bore 70, 72 and 74, respectively. The bosses 64 and 66 with respective apertures 70 and 72 are located near the opposed terminal ends of the bar 62 and are adapted to receive in loose relation suitable screws or other fasteners by which the switch SW7 is secured in mounted relation to an appropriate backing, such as the dashboard of an automobile. The central boss 68, which has a tapered exterior surface 76, together with the bore 74 are centrally disposed of the bar 62.

The support structure 60 also comprises a yoke 80 having identical, though opposite hand resilient arms 82 and 84, each presenting aligned inwardly directed stepped projection 86. The yoke 80 defines at the central interior surface a rectangular recess 88 from which an outwardly divergent central bore 90 extends. The tapered bore 90 mates precisely with the exterior surface 76 of the boss 68 of the bar 62. In this way, the bar 62 is journaled to the yoke 80 for relative rotational movement. The journal relation is maintained by a fastener 100 having a flanged head 102 which engages both the recess surface 88 of the yoke 80 and the adjacent end surface 89 of the boss 68 of the bar 62. The fastener 100 also comprises a retainer ring 104 which is secured to the central shaft of the fastener so as to prevent separation of the parts of the fastener while permitting rotation of the bar 62 and the yoke 80.

The switch SW7 also comprises two mated semispheres 110 and 112. The semispheres are press-fit together in male-female relation along the interface 114 between the two. A pair of sockets 116 and 118 at the interface 114 receive the reduced diameter portion of the projection 86 in press-fit relation, the arms 82 and 84 of the yoke 80 being resilient sufficient to allow spreading and recovery by memory to receive the mated semispheres, as best illustrated in FIG. 4.

The semisphere 112 is transparent so that the hereinafter explained pendulum and associated electrical connectors are readily visible. Together the sphere comprising halves 110 and 112 may be rotated in respect to the yoke 80 along an axis centrally bridging between the two projections 86. Consequently, in view of the pivotal relation between the bar 62 and the yoke 80 and the pivotal relation between the yoke 80 and the sphere comprising halves 110 and 112, the pendulum switch SW7 may be set along $x$, $y$ and $z$ coordinates in an open condition independent of the orientation of the vehicle in which it is mounted.

While both spheres 110 and 112 are hollow, sphere 110 comprises at the bottom thereof a pair of parallel inwardly directed ribs 120 and 122, which are integral with the remainder of the sphere and between which extends an open slot 124 in the bottom of the semisphere 110. A central plate or disc 130 is secured firmly within the plane defined by the press-fit line 114 between the two semispheres, being secured at the inside of the male lip of the semisphere 110 at that location.

Mounted at the front of the plate 130 is a conductive bracket 140, which is generally V-shaped in configuration when viewed in plan. One end of the wire bracket 140 is mounted and secured firmly in the electrically insulating material of the plate 130 while the other end passes entirely through the plate and is secured to wire W2 (not shown in FIGS. 3 through 5) in a conventional manner. The central portion of the V of the wire 140 is downwardly recessed at 142 and receives at that location the eye 144 of a pendulum rod 146. The lower end of the pendulum rod terminates in a weight 148 causing the rod 146 to hang vertically in response to the force of gravity.

A second wire contact 150 extends from the interior of the semisphere 110 into the interior of the semisphere 112 and there defines a loop 152 through which the pendulum rod 146 extends. The manner in which the wire 150 is secured and allowed to be adjusted will hereinafter be more fully explained. For the time being, it should be observed, in reference to FIG. 3, that the wire 150 extends through an elongated vertical slot 154 in the plate 130. The back of the plate 130 and integral therewith comprises two spaced vertical ribs 156 and 158 which merge with two horizontally directed ribs 160 and 162, at the ends thereof, respectively, the four ribs together forming an enclosure which is open at the interior of the semisphere 110 at the back of the plate 130 and at the slot 154 at the front. The vertical ribs 16 and 158 comprise guide s structure which defines a vertical path along which a block 170 is displaced up and down and hold against rotation.

The guide block 170 is preferably of injection-molded plastic, as is the plate 130. The wire 150 fits within a side-open groove 172 central of the block 170 such that the block 170 and the wire 150 move together. The wire 150 is joined at its end 174 to wire W9 (not shown in FIGS. 3 through 5). The block 170 has a central threaded bore through which a threaded screw 180 passes in threadedly engaged relation. The head 182 of the screw 180 is closely spaced from the inside surface of the semisphere 110 so that vertical movement of the screw 180 is essentially prohibited, the threaded shaft of the screw 180 passing loosely through an aperture 184 in the rib 160 and an aperture 186 in the rib 162. A knurled thumbscrew 190 is nonrotatably mounted at the lower end of the screw 180 and extends beyond the semispheres 110 and 112 as does the lower end of the screw 180 per se, through the slot 124.

Consequently, rotation of the knurled thumbscrew 190 in one direction or the other will correspondently rotate the screw 190 in respect to the nonrotatable block 170. Accordingly, the block 170 will be caused to move up or down in the space between the spaced ribs 156 and 158, the wire 150 following the indicated displacement. Therefore, the location of the eyelet 152 of the wire 150 will likewise move either up or down in respect to the pendulum rod 146. Accordingly, the amount of linear displacement required through swinging motion of the rod 146 to make contact between the rod 146 and the eyelet 152 and energize the circuitry of FIG. 1 to an alarm condition will vary depending upon the vertical setting of wire 150 established by the turning of the thumbscrew 192. Thus, the pendulum switch SW7 may be adjusted in its sensitivity.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A pendulum switch comprising:
   means for mounting the switch to a support, said mounting means comprising means by which the three dimensional position of a switch housing carried by the mounting means may be adjusted;
   normally spaced first and second electrically conductive means respectively adapted to be connected to a source of electrical energy and to a circuit, one of said conductive means comprising a pivotal pendulum rod and the other an eyelet; and
   means for adjusting the sensitivity of the switch comprising anchor means in the form of a body of material having a tapped central bore and carrying said eyelet and means for displacing the anchor means and eyelet in the form of a threaded shank threadedly joined to the anchor means at said bore and including a knob by which the shank is rotated to elevate or lower the anchor means and eyelet as a unit generally in respect to the axis of the pendulum rod so as to change the distance of the pivot point of the pendulum rod relative to the eyelet.

2. A pendulum switch as defined in claim 1 wherein the switch housing defines guide structure defining the path of the anchor means and structure for rotatably retaining the shank in the mentioned relation with the anchor means.

* * * * *